(12) United States Patent
Levy

(10) Patent No.: US 7,565,524 B2
(45) Date of Patent: Jul. 21, 2009

(54) COMPUTER BACKUP SYSTEM AT BIOS LEVEL

(76) Inventor: Itzhak Levy, 3100 N. 29th Ct., Hollywood, FL (US) 33020

( * ) Notice: Subject to any disclaimer, the term of this patent is extended or adjusted under 35 U.S.C. 154(b) by 25 days.

(21) Appl. No.: 11/480,709

(22) Filed: Jul. 3, 2006

(65) Prior Publication Data

US 2008/0052427 A1 Feb. 28, 2008

(51) Int. Cl.
*G06F 15/177* (2006.01)
*G06F 13/00* (2006.01)
*G06F 12/00* (2006.01)

(52) U.S. Cl. .................... 713/2; 711/162; 707/204

(58) Field of Classification Search ............. 713/1, 713/2
See application file for complete search history.

(56) References Cited

U.S. PATENT DOCUMENTS

| | | | |
|---|---|---|---|
| 6,175,904 B1 * | 1/2001 | Gunderson | 711/162 |
| 6,611,850 B1 * | 8/2003 | Shen | 707/204 |
| 6,658,435 B1 * | 12/2003 | McCall | 707/204 |
| 6,665,778 B1 * | 12/2003 | Assaf | 711/156 |
| 7,089,449 B1 * | 8/2006 | Cluff et al. | 714/15 |
| 7,111,203 B2 * | 9/2006 | Hu et al. | 714/36 |
| 7,191,328 B2 * | 3/2007 | Hobson | 713/2 |
| 7,395,420 B2 * | 7/2008 | Rothman et al. | 713/1 |
| 2003/0177329 A1 * | 9/2003 | Larvoire et al. | 711/173 |
| 2007/0180207 A1 * | 8/2007 | Garfinkle | 711/162 |

OTHER PUBLICATIONS

"BIOS". Wikipedia, Nov. 17, 2008, pp. 1-6. http://en.wikipedia.org/wiki/BIOS.
"Hidden Protected Area". ThinkWiki, Nov. 13, 2008, pp. 1-4. http://www.thinkwiki.org/wiki/Hidden_Protected_Area.
"Host Protected Area". Wikipedia, Nov. 13, 2008, pp. 1-4. http://en.wikipedia.org/wiki/Host_Protected_Area.
Mayank R. Gupta, et al. "Hidden Disk Areas: HPA and DCO". International Journal of Digital Evidence, Fall 2006, V. 5, Issue 1, pp. 1-8.

* cited by examiner

*Primary Examiner*—Suresh K Suryawanshi
(74) *Attorney, Agent, or Firm*—Perkins Coie LLP

(57) ABSTRACT

A computer motherboard has a central processor socket, memory sockets, and a plurality of connectors for connecting peripheral devices to the motherboard. Two or more storage ports enable connection of storage devices (e.g., HDDs) to the motherboard. A system BIOS that is resident on the motherboard contains computer-executable program code for enabling backup and restore functionality on the storage devices connected to the storage ports.

22 Claims, 9 Drawing Sheets

27 — Integrated Backup - Initialization

| Select the Source & Backup Devices | Source Device: | Maxtor 62130<br>WD 1234<br>Seagate ST1234<br>USB - 250 GB |
|---|---|---|
| | Backup Device: | Maxtor 62130<br>WD 1234<br>Seagate ST1234<br>USB - 250 GB |
| ESC: Quit<br>F10: Save & Exit Setup | ↓↑ → ← Select Item | |

FIG. 5

28 — Integrated Backup - Backup

Data from your source device - Maxtor 62130  will be copied to your Backup Device - WD 1234

All Data on your Backup Device will be replaced
　　　Do you want to continue (Y/N)

ESC: Quit

FIG. 6

31 — Integrated Backup - Restore

Data from your backup device - WD 1234 will be restored to your Device - Maxtor 62130

All Data on your Maxtor 62130 will be replaced
Do you want to continue (Y/N)

ESC: Quit

FIG. 9

32 — Integrated Backup - Restore

Restore in Progress    WD 1234 => Maxtor 62130

Stop    Pause

ESC: Quit                                    → ← Select Item

FIG. 10

COMPUTER BACKUP SYSTEM AT BIOS LEVEL

BACKGROUND OF THE INVENTION

Field of the Invention

The invention lies in the computer technology field. More specifically, the invention relates to a backup and restore of the computer data.

The personal computer revolution of the early 1980's created a need for data storage devices with the ability to read/write and modify data as needed by the computer applications. Before the personal computer revolution, data was saved on magnetic ring units that occupied a large space and had a limited capacity and very low performance levels.

With the personal computer revolution, the market demanded a larger storage capacity and more compact sized storage device that could be connected to the computer. The first Personal Computer (PC) that was produced by IBM (International Business Machines) in the early 1980's supported a 5.25" floppy disk with a limited storage capacity and very poor performance. At the time it was the height of technology.

With the release of the IBM XT, the first Hard File Device—an ST506 5.25" 10 MB Disk—was introduced in the personal computer market. As software applications began to require more and more storage space and a faster data transfer rate between the computer and the storage device, the computer industry faced a challenge of supplying faster and higher capacity storage devices.

The computer industry has introduced various types of storage devices such as hard disks, tape drives, Optical disks, CD ROMs, DVD players, removable media (Floppy Drives, Zip drive) with various types of interface formats (ST506, ESDI, IDE, EIDE, ATA, SATA, SCSI, SAS) with the goal of being faster, higher-capacity and more affordable to the user.

As the computer data grow the user faces a growing challenge to backup and protect the data. Over time, the computer industry has introduced different types of backup devices. We all remember the floppy disks, tape drives, Iomega Zip drives and SyQuest removable disks. As data storage demands outgrew the above tools, these could no longer provide adequate capacity or the speed of storing or recovering data necessary to handle these volumes of data.

Once the FireWire and the USB interfaces were available the computer industry was able to take advantage of the low cost of ATA/SATA disk drives. With a bridge to convert signals from USB/FireWire to ATA/ATAPI devices, users now have access to virtually unlimited storage capacity (the limitation being the largest disk drive available at any given time). Computer users quickly adopted the idea that "You backup a data disk with another data disk," and started using the USB/FireWire external drives as a backup devices The availability of backup devices using disk drives as the main media for storing data did not solve the user dilemma of protecting their data. The users are relying on software applications to handle backup and be there when the need arises to restore files. The computer industry introduced a number of backup utilities under various operating systems to eliminate the inconvenience and complexity of backup from the users.

It is not enough to back up that data. It is important for the user to know that he can restore quickly and easily whenever the need arises. One of the best types of backup is the image (drive cloning) backup, since this produces a backup copy which is identical to the original drive. In the event of a primary disk failure, the backup disk can replace the system disk or be used to quickly restore the data from the backup disk to a new disk. The image backup will avoid the need to re-install the operating system and software applications before needed data files can be accessed.

SUMMARY OF THE INVENTION

It is accordingly an object of the invention to provide a backup system, which overcomes the above-mentioned disadvantages of the heretofore-known devices and methods of this general type and which introduces a method of backup and restore via the computer motherboard BIOS (Basic Input/Output System) system. Implanting the backup and restore option into the BIOS system of every computer would provide internal support for creation of an image backup and will provide simple steps for recovery when needed.

With the foregoing and other objects in view there is provided, in accordance with the invention, a computer motherboard, comprising:

at least one central processor and a plurality of connectors for connecting peripheral devices (input devices (keyboard, mouse), output devices, etc.), to the motherboard;

a plurality of storage ports;

a system BIOS resident on the motherboard, the system BIOS containing computer-executable program code for enabling backup and restore functionality for storage devices connected to respective storage ports. The code may either contain the entire instruction set for the program application, or it may contain a call feature for calling (addressing) the program application at a given memory address or parking location (HPA or hidden partition).

In accordance with an added feature of the invention, the system BIOS is stored in a memory core location on the motherboard. In the alternative, or in addition (by way of code extension), the computer-executable program code for enabling backup and restore functionality is stored on a memory module connected to the computer via an add-on card plugged into one of the computer slots.

In accordance with an additional feature of the invention, the storage ports are configured for communication through a protocol selected from the group consisting of ATA, SATA, SAS, SCSI, USB, and FireWire.

In accordance with another feature of the invention, the system BIOS includes computer-executable code enabling a user to select a first storage device connected to one of the storage ports as a source device and a second storage device connected to another one of the storage ports as a backup device.

For simplicity to the user the backup port may be a fixed port designated by the motherboard manufacturer. In this case the user would only have to select the source device and the device connected to the fixed backup port would automatically be selected as the backup device. In the event of fixed backup port the port would be key colored so it can be easily identified by the user.

Preferably, the system BIOS includes computer-executable code providing a user-selectable feature for copying all data from the source device to the backup device. In addition, the BIOS code may provide a user-selectable feature for copying data from the source device to the backup device on an incremental basis or on valid data blocks basis. In addition, the system BIOS may include a user-selectable feature for restoring data from the backup device to a new storage device designated as a restore device. The data restore may be implemented on an incremental basis or on valid data blocks basis.

In accordance with a preferred embodiment of the invention, the code is programmed to create a clone of the valid data or all data so as to cause the backup device to become a bootable drive. Similarly, the system BIOS may create a clone to the backup drive so as to cause the restored device to become a bootable drive.

In accordance with a concomitant feature of the invention, computer-executable instructions with backup device software and restore software may be located in a host protected area (HPA) or at a given address location of a computer memory map. In that case, it is advantageous to provide for a screen display during bootup that allows the user to start the backup and restore application. For instance, the ESC key may be suggested as a trigger into the backup and restore application.

In a further advantageous embodiment of the invention, one of the above-mentioned storage ports is a dedicated backup port. The dedicated backup port is installed by the motherboard manufacturer and it may be coded (e.g., color coded) so as to be recognizable as the backup port by a user.

Other features which are considered as characteristic for the invention are set forth in the appended claims.

Although the invention is illustrated and described herein as embodied in a motherboard with backup system at the BIOS level, it is nevertheless not intended to be limited to the details shown, since various modifications and structural changes may be made therein without departing from the spirit of the invention and within the scope and range of equivalents of the claims.

The construction of the invention, however, together with additional objects and advantages-thereof will be best understood from the following description of the specific embodiment when read in connection with the accompanying drawings.

BRIEF DESCRIPTION OF THE DRAWING

FIG. 5 shows a BIOS screen with the option to select the source and backup devices;

FIG. 6 shows a BIOS screen with the backup option selected;

FIG. 9 shows a BIOS screen with the restore option selected;

FIG. 10 shows a BIOS screen with the progress bar for the restore option;

DESCRIPTION OF THE PREFERRED EMBODIMENTS

Figure 1:
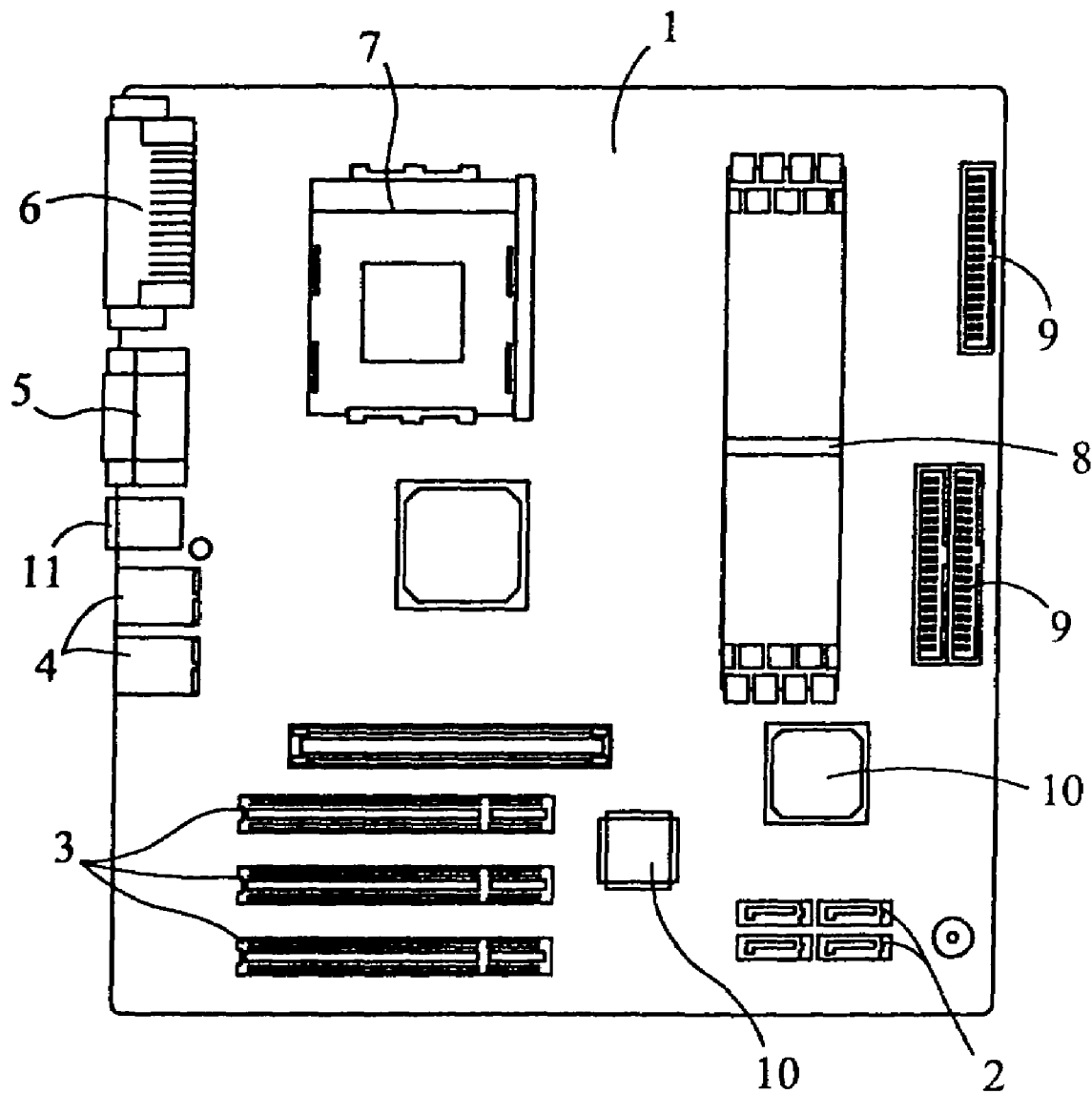
FIG. 1 shows a typical motherboard with a variety of storage ports.

Referring now to the figures of the drawing in detail and first, particularly, to FIG. 1 thereof, there is shown a motherboard 1 with four SATA storage ports 2, three PCI slots 3, two USB ports 4, one serial port 5, one parallel port 6, a processor socket 7, four memory sockets 8, three parallel ATA connectors 9, one keyboard/mouse port 11, and some logic components 10.

Figure 2:
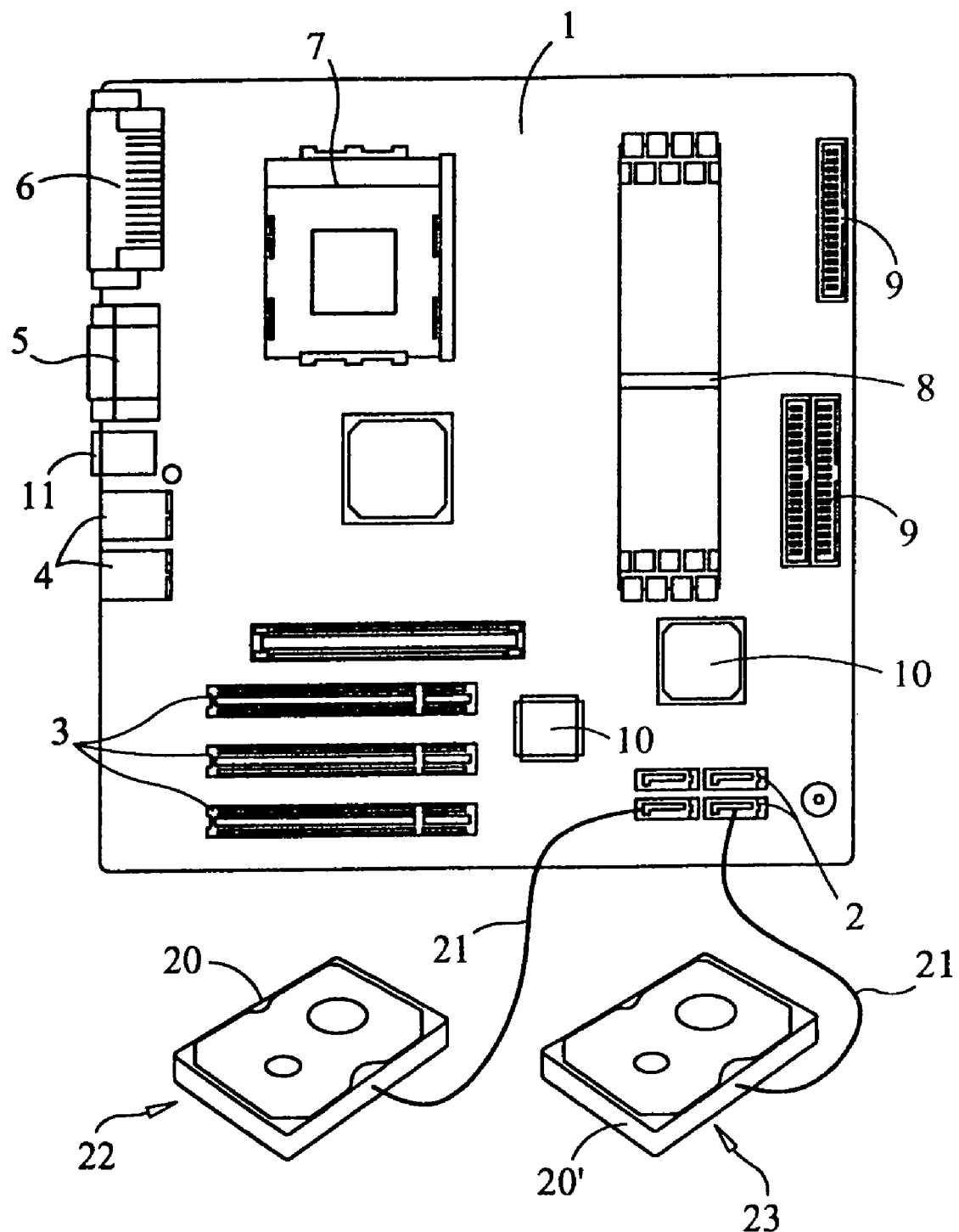
FIG. 2 shows two storage devices connected to the storage ports on the motherboard.

FIG. 2 shows a storage device 20—here a hard disk drive—connected to the motherboard 1 storage port 2 via a serial ATA (SATA) cable 21. The first-mentioned storage device 20 is configured as a source device 22. The same figure also shows a second storage device 20' connected to the second storage port 2 on the motherboard 1. The second storage device 20'—here also a hard disk drive—is configured as a backup device 23.

Figure 3:
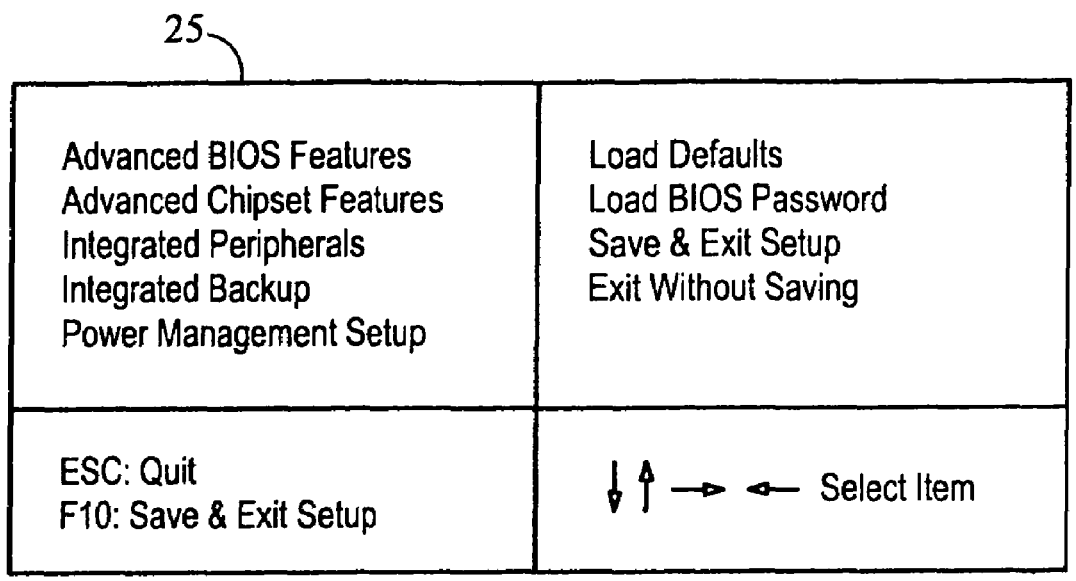
FIG. 3 shows a BIOS screen with the integrated backup feature.

FIG. 3 shows a proposed BIOS screen 25 with the integrated backup feature as an option that can be selected by the user. BIOS is an acronym representing "basic input/output system" or "basic integrated operating system." It is the basic code which is loaded into a computer on first powering it on. The initial loading is referred to as "booting." During the boot, the BIOS code is run from the motherboard. The basic functions of the computer system and the input/output as well as the connections to the primary peripherals are established. In most cases, the BIOS code also contains diagnostic routines for the disk system, the memory, video display memory, and other components.

In the early personal computer years during the 1980's, the BIOS remained resident after boot and it remained the central, basic operating system as the computer was running. With the advent of higher-level operating programs and the newer Windows® systems, the BIOS code became less and less important. More recently, however, the BIOS has become more important again (e.g., ACPI) in that the code is loaded with more functionality and the BIOS coded routines are more complex, including power and thermal management as well as hot-plug functionality.

Currently available BIOS cores are not yet enabled to take on the backup and restore functionality according to the invention. Such additional coding on the BIOS level, however, would not present any difficulty to a programmer versed in BIOS code programming. Also, BIOS cores on flash memory, ROM, PROM, EPROM, EEPROM, may be easily expanded to store the necessary amounts of data. The invention takes account of the currently insufficient BIOS capacity by providing the application code on a host protected area (HPA) on the storage device.

Figure 4:
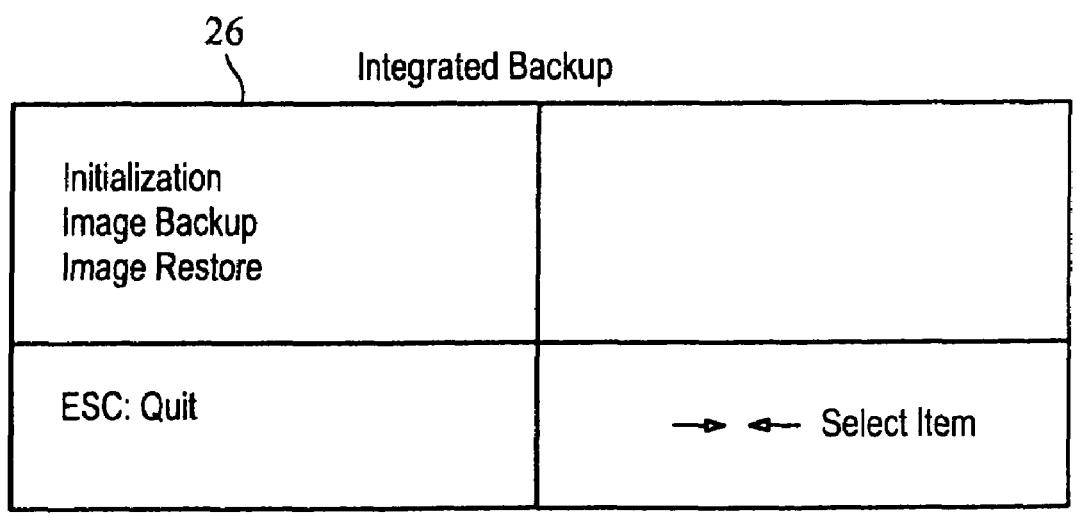
FIG. 4 shows a BIOS screen with the integrated backup feature selected.

Returning now to the drawing figures, FIG. 4 shows a proposed BIOS screen 26 with the next level options, following FIG. 3, once the integrated backup option has been selected.

FIG. 5 shows a proposed BIOS screen 27 to select the source and backup devices once the integrated backup option has been selected.

FIG. 6 shows a proposed BIOS screen 28 for the backup function once the backup option has been selected.

Figure 7:
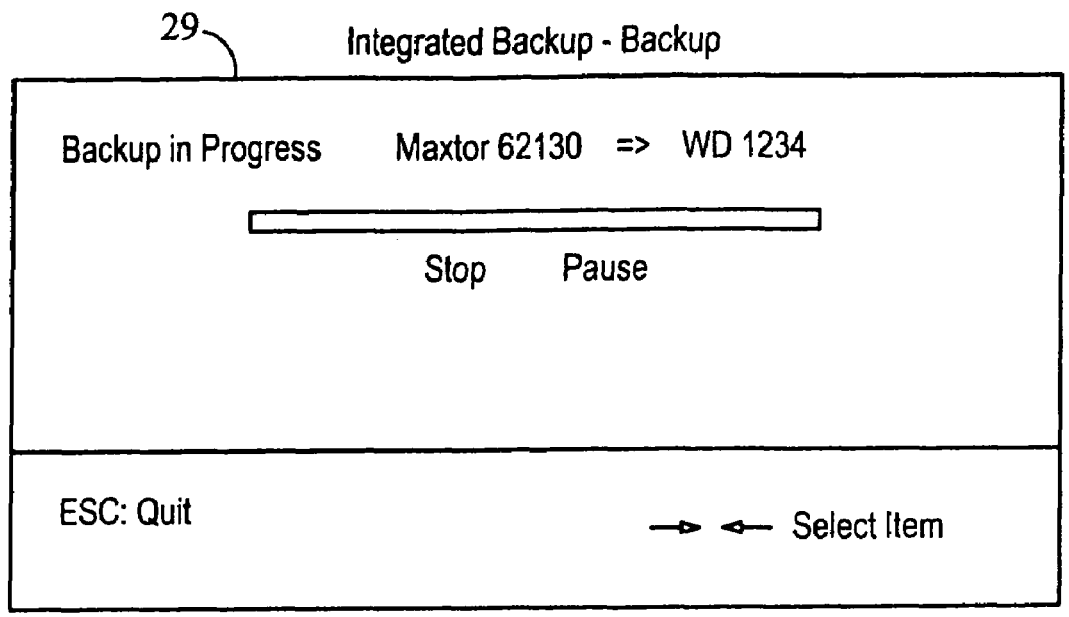
FIG. 7 shows a BIOS screen with the progress bar for the backup option.

FIG. 7 shows a proposed BIOS screen 29 with a progress bar to show the progress of the backup once the backup function was started. The progress can be displayed via some other means beside a progress bar and using the progress bar should not be a limitation to this invention.

Figure 8:
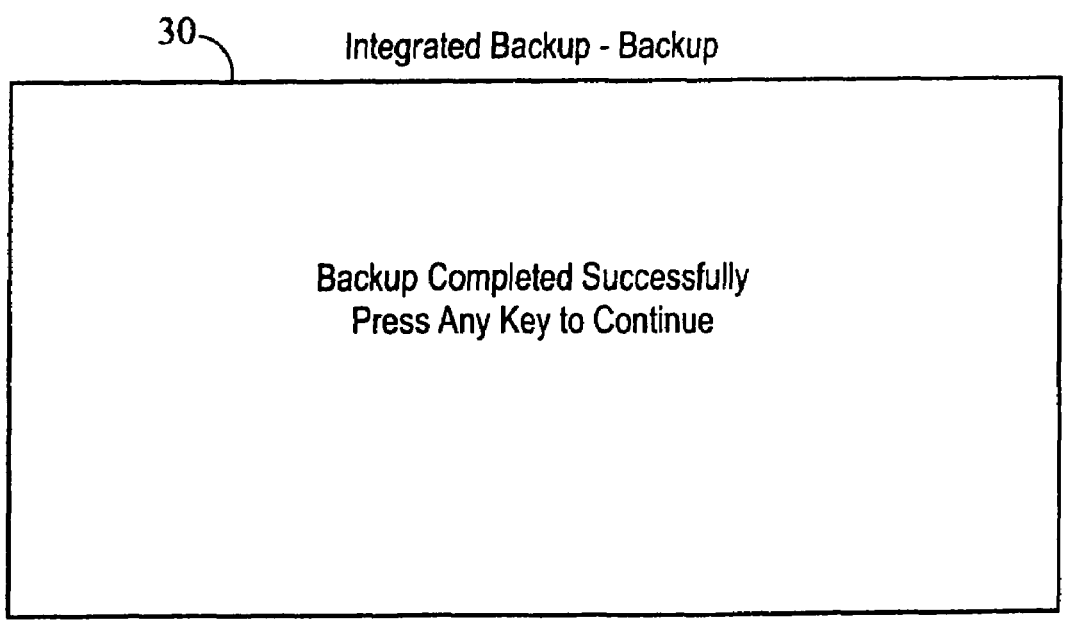
FIG. 8 shows a BIOS screen with a backup successful message.

FIG. 8 shows a proposed BIOS screen 30 for a successful backup function.

FIG. 9 shows a proposed BIOS screen 31 for the restore once the restore option has been selected.

FIG. 10 shows a proposed BIOS screen 32 with a progress bar to show the progress of the restore once the restore function was started. The progress can be displayed via some other means beside a progress bar and using the progress bar should not be a limitation to this invention.

Figure 11:
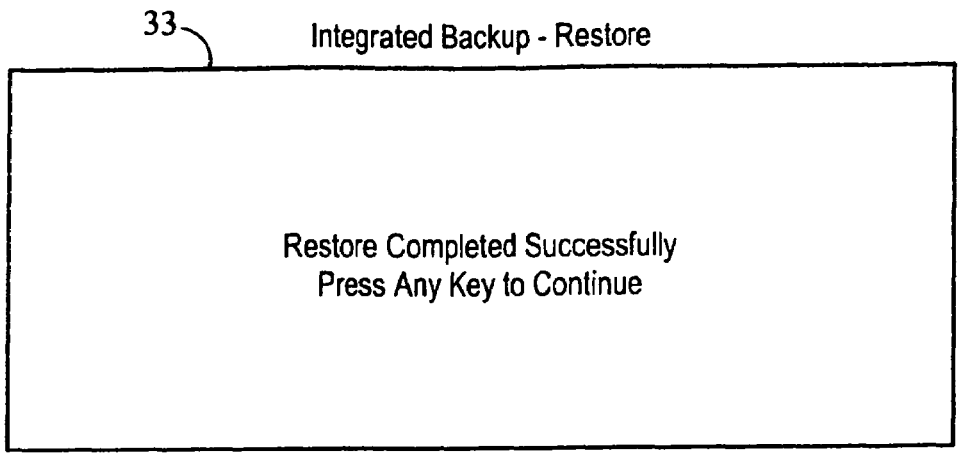
FIG. 11 shows a BIOS screen with a restore successful message.

FIG. 11 shows a proposed BIOS screen 33 for a successful restore function.

Figure 12:
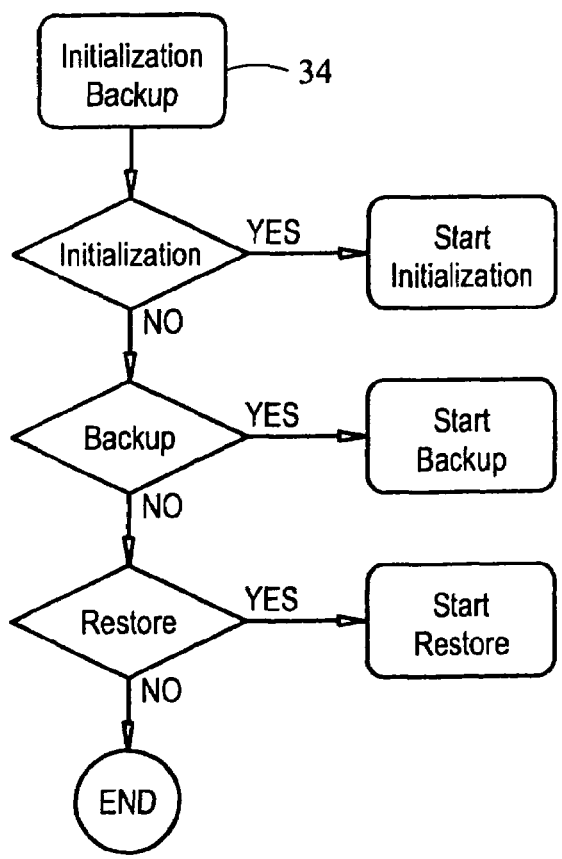
FIG. 12 shows a flowchart of events once the integrated backup feature has been selected.

FIG. 12 shows the flow of the choice the user would have once the integrated backup feature has been selected. The user can select between Initialization of the source and backup device or start the backup or restore once the source and backup has been set.

Figure 13:
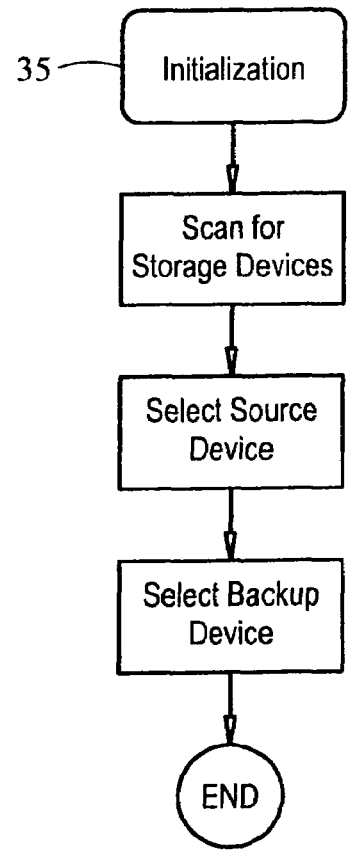
FIG. 13 shows a flowchart of events once the initialization option feature has been selected.

FIG. 13 once the initialization option has been selected the system BIOS will scan list all valid storage devices that are connected directly to the motherboard or connected via an add on card through one of the expansion slots. At that point the user can select the source and backup device.

Figure 14:
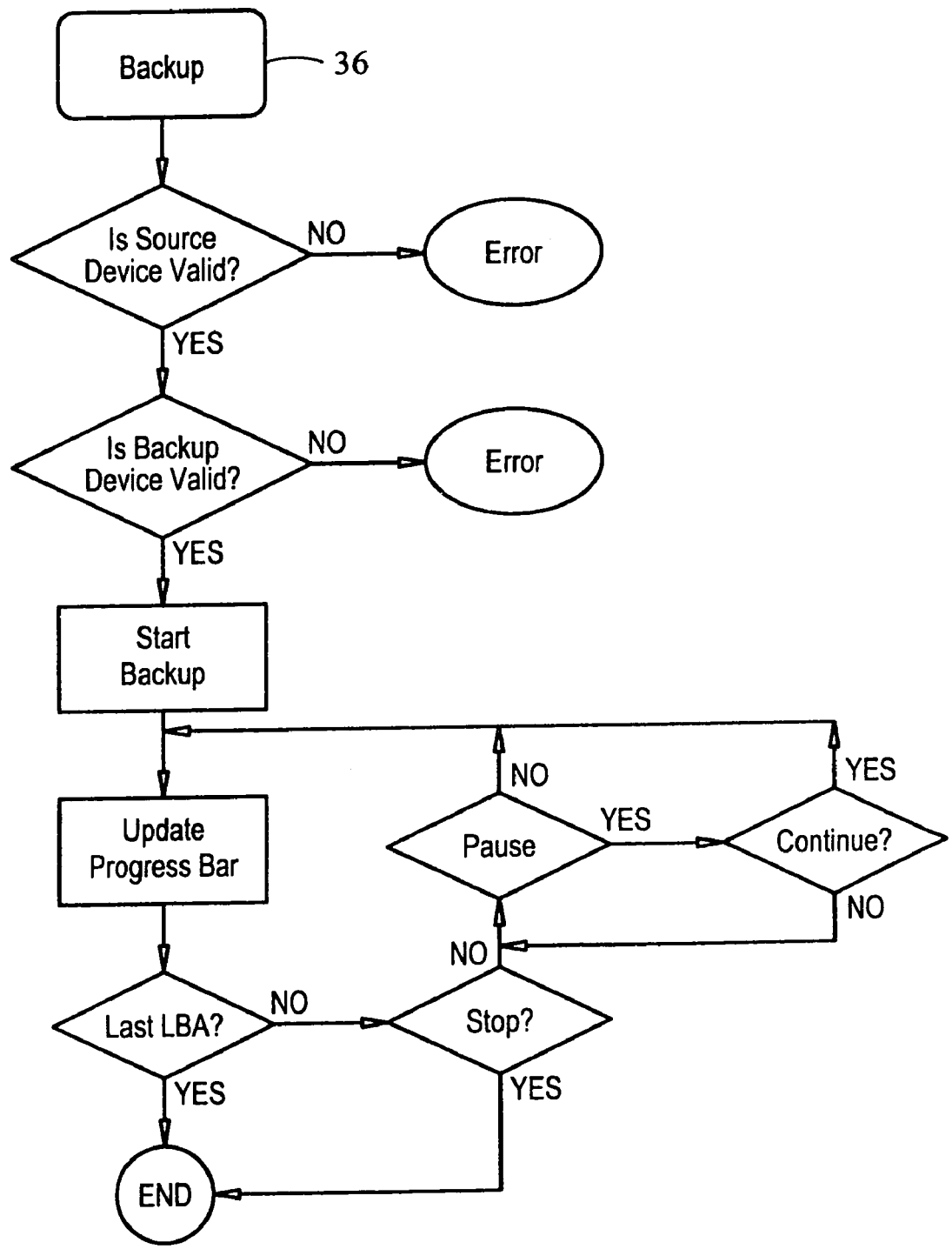
FIG. 14 is a flowchart illustrating the backup routine that is triggered when the backup option feature has been selected.

FIG. 14 once the user selects the backup option the system BIOS will check for valid source and backup devices before backup can start. Once backup starts a progress bar will show the percentage of data copied. The user can abort or pause the backup function. The progress bar is only one way of showing the backup progress and should be used as limitation with regards to this invention.

Figure 15:
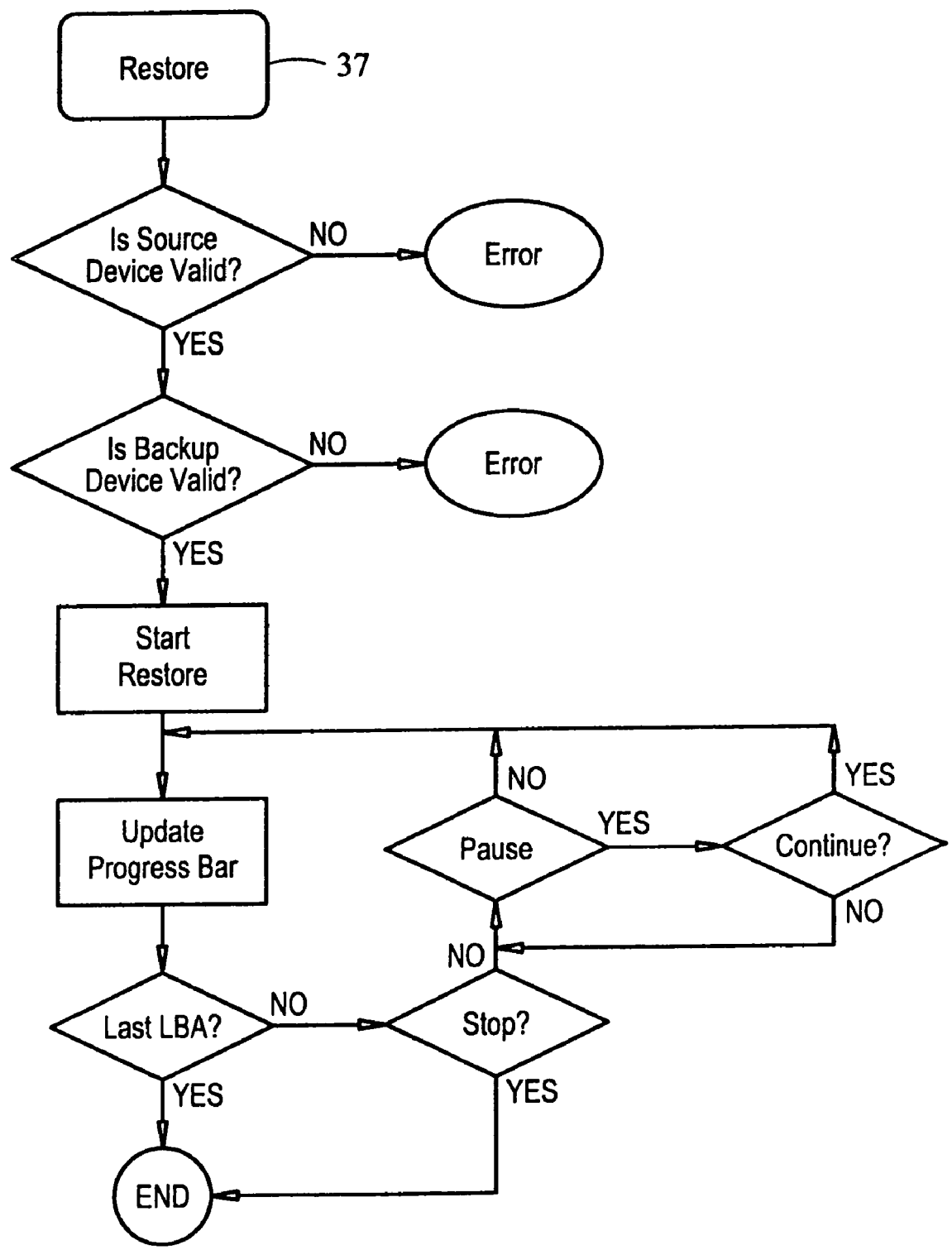
FIG. 15 is a flowchart illustrating the restore routine that is triggered when the restore option feature has been selected.

FIG. 15 once the user selects the restore option the system BIOS will check for valid backup device and new device for the data to be restored. Once restore starts, a progress bar will show the percentage of data restored. The user can abort or pause the restore function. The progress bar is only one way of showing the backup progress and should be used as limitation with regards to this invention.

In a particularly user-friendly implementation of the invention, the boot-up sequence may include a screen such as "Press the ESC key to enter the integrated backup and restore utility . . . " and the BIOS bootup, upon reading the triggering of the ESC key, would be adapted to call the corresponding application.

It will be understood by those of skill in the art that the illustrated screen displays and the text should not be a limitation with regard to the scope of the invention, and that a multitude of variations are possible to the look and feel of the user interface for the BIOS screens.

To sum once more, I consider distinct implementations of the novel configuration, namely:

Integrating the image backup and restore functionality to the motherboard and system BIOS; or Adding an add-on card to one of the motherboard slots with an extension BIOS that will allow the backup and restore function as if it were integrated on the motherboard system BIOS; and/or Adding the application program to the Host Protected Area (HPA) on the storage device; and/or Adding a backup port on the motherboard (added by the motherboard manufacturer) and color-coded for easy recognition by the user.

I claim

1. A computer motherboard, comprising:
a first storage medium storing a first Basic Input/Output System (BIOS), wherein the first BIOS includes first computer-executable instructions to be executed by a processor of a computing device operably coupled to the computer motherboard during initialization of the computing device; and a second storage medium storing a second BIOS, wherein the second BIOS includes second computer-executable instructions that, when executed by the processor, enable backup of data stored on a storage device operably coupled to the computer motherboard, wherein the first BIOS is configured to access the second BIOS.

2. The computer motherboard of claim 1, further comprising a storage port operably coupled to the storage device, wherein the storage port is configured for communication through a protocol selected from the group consisting of ATA, SATA, SAS, SCSI, USB, and FireWire.

3. The computer motherboard of claim 1 wherein the storage device is a first storage device, and further comprising:
a first storage port configured to be connected to the first storage device;
a second storage port configured to be connected to a second storage device, and wherein the second computer-executable instructions, when executed by the processor, further enable selection of the first storage device as a source storage device and selection of the second storage device as a backup storage device.

4. The computer motherboard of claim 3 wherein the second computer-executable instructions, when executed by the processor, further enable copying of data from the source storage device to the backup storage device.

5. The computer motherboard of claim 3 wherein the second computer-executable instructions, when executed by the processor, further enable copying data from the source storage device to the backup storage device on a valid data blocks basis.

6. The computer motherboard of claim 3 wherein the second computer-executable instructions, when executed by the processor, enable a clone of data on the source storage device to be made on the backup storage device so as to cause the backup device to become a bootable storage device, if the source storage drive was bootable.

7. The computer motherboard of claim 3 wherein the second computer-executable instructions, when executed by the processor, enable restoration of data from the backup storage device to a third storage device designated as a restore storage device.

8. The computer motherboard of claim 7 wherein the second computer-executable instructions, when executed by the processor, enable restoration of data from the backup storage device to the restore storage device on a valid data blocks basis.

9. The computer motherboard of claim 7 wherein the second computer-executable instructions, when executed by the processor, enable a clone of data on the backup storage device to be made on the restore storage device so as to cause the restore storage device to become a bootable storage device, if the backup storage device was bootable.

10. The computer motherboard of claim 1 wherein the storage device is a first storage device, and further comprising:
a first storage port configured to be connected to the first storage device; and
a second storage port configured to be connected to a second storage device operably coupled to the computer motherboard, wherein the second storage port is a dedicated backup port.

11. The computer motherboard of claim 10 wherein the second storage port is coded so as to be recognizable as the dedicated backup port by a user.

12. A computing system, comprising:
a processor;

a storage device configured to store data;

a first storage medium storing a first Basic Input/output System (BIOS), wherein the first BIOS is to be loaded during initialization of the computing system; and a second storage medium storing a second BIOS, wherein the second BIOS includes computer program code that, when executed by the processor, enable backup of the storage device, wherein the first BIOS is configured to access the second BIOS.

13. The computing system of claim 12 wherein the storage device is a first storage device, and further comprising a second storage device, and wherein the computer program code, when executed by the processor, is further configured to enable backup of data stored on the first storage device to the second storage device.

14. The computing system of claim 13 wherein the computer program code, when executed by the processor, is further configured to enable copying data from the first storage device to the second storage device on a valid data blocks basis.

15. The computing system of claim 13 wherein the computer program code, when executed by the processor, is further configured to enable copying data from the first storage device to the second storage device on an incremental basis.

16. The computing system of claim 13 wherein the computer program code, when executed by the processor, is further configured to enable a clone of data on the first storage device to be made on the second storage device so as to cause the second storage device to become a bootable storage device, if the first storage drive was bootable.

17. The computing system of claim 16, wherein the computer program code, when executed by the processor, is further configured to enable restoration of data to the data-storage device.

18. The computing system of claim 12, further comprising a display, and wherein when backup of data stored on the storage device is in progress, the computer program code, when executed by the processor, is further configured to provide an indication of the progress to the display.

19. A computing device, comprising:
means for processing;
means for storing data;
means for backing up data;
means for storing a first Basic Input/Output System (BIOS), wherein the first BIOS is configured to be processed by the means for processing during initialization of the computing device; and
means for storing a second BIOS;
wherein the first BIOS is configured to access the second BIOS, and wherein the second BIOS is configured to provide access to the means for backing up data.

20. The computing device of claim 19 wherein the means for storing data is a first means for storing data, and further comprising a second means for storing data, and wherein the means for backing up data backs up data stored on the first means for storing data to the second means for storing data.

21. The computing device of claim 19, further comprising means for restoring data, wherein the second BIOS is further configured to access the means for restoring data.

22. The computing device of claim 21 wherein the means for restoring data restores data to the means for storing data.

* * * * *